US011539052B2

(12) United States Patent
Abdul Jabbar

(10) Patent No.: US 11,539,052 B2
(45) Date of Patent: Dec. 27, 2022

(54) METAL-BASED SOLID OXIDE ELECTROCHEMICAL DEVICES

(71) Applicant: Nissan North America, Inc., Franklin, TN (US)

(72) Inventor: Mohammed Hussain Abdul Jabbar, Farmington Hills, MI (US)

(73) Assignee: Nissan North America, Inc., Franklin, TN (US)

(*) Notice: Subject to any disclaimer, the term of this patent is extended or adjusted under 35 U.S.C. 154(b) by 160 days.

(21) Appl. No.: 16/911,650

(22) Filed: Jun. 25, 2020

(65) Prior Publication Data

US 2021/0408553 A1    Dec. 30, 2021

(51) Int. Cl.
*H01M 4/86* (2006.01)
(52) U.S. Cl.
CPC ....... *H01M 4/8657* (2013.01); *H01M 4/8626* (2013.01); *H01M 2004/8684* (2013.01); *H01M 2004/8689* (2013.01); *H01M 2300/0071* (2013.01)
(58) Field of Classification Search
CPC ............. H01M 4/8657; H01M 4/8626; H01M 2004/8684; H01M 2004/8689; H01M 2300/0071; H01M 8/0271; H01M 4/861; H01M 4/8642; H01M 4/8663; H01M 8/121
See application file for complete search history.

(56) References Cited

U.S. PATENT DOCUMENTS

| 5,543,239 | A | * | 8/1996 | Virkar | C04B 35/01 429/525 |
|---|---|---|---|---|---|
| 8,354,200 | B2 | | 1/2013 | Terada et al. | |
| 2003/0077504 | A1 | * | 4/2003 | Hara | H01M 8/0247 429/456 |
| 2006/0269813 | A1 | * | 11/2006 | Seabaugh | H01M 8/1253 264/618 |
| 2010/0143824 | A1 | | 6/2010 | Tucker et al. | |
| 2011/0033772 | A1 | | 2/2011 | Tucker et al. | |
| 2013/0078448 | A1 | | 3/2013 | Tucker et al. | |
| 2018/0323443 | A1 | | 11/2018 | Tucker et al. | |

FOREIGN PATENT DOCUMENTS

WO         2009128849 A1    10/2009

* cited by examiner

*Primary Examiner* — Helen Oi K Conley
(74) *Attorney, Agent, or Firm* — Young Basile Hanlon & MacFarlane, P.C.

(57) ABSTRACT

A solid oxide electrochemical device comprises a solid electrolyte layer, the first surface and second surface having surface pores formed therein; a first composite electrolyte layer composed of metal and a solid electrolyte and having a first porosity; a second composite electrolyte layer composed of metal and the solid electrolyte and having the first porosity, the solid electrolyte layer sandwiched between the first composite electrolyte layer and the second composite electrolyte layer; a cathode on one of the first composite electrolyte layer and the second composite electrolyte layer; and an anode on another of the first composite electrolyte layer and the second composite electrolyte layer. The anode comprises an anode metal layer comprising pores; anode active material; and reforming catalyst, wherein the anode active material and the reforming catalyst line walls of the pores in the anode metal layer.

21 Claims, 3 Drawing Sheets

US 11,539,052 B2

1

METAL-BASED SOLID OXIDE ELECTROCHEMICAL DEVICES

TECHNICAL FIELD

This disclosure relates to solid oxide electrochemical devices having metal-based layers, and in particular, metal-based electrodes and metal-based electrolyte layers.

BACKGROUND

Solid oxide fuel cells having an electrolyte-supported configuration have poor mechanical strength and exhibit poor performance due to high electrolyte resistance. Solid oxide fuel cells having an electrode-supported configuration are somewhat stronger and better performing than the electrolyte-supported configurations. However, the solid oxide fuel cells having an electrode-supported configuration also fail to meet the strength and performance requirements needed for automotive applications, due, in part, to the rapid heating and cooling cycles during start-up or switch off of the fuel cell.

SUMMARY

Disclosed herein are implementations of solid oxide electrochemical devices, such as solid oxide fuel cells, having metal-based layers. The metal-based layers include one or more metal-based electrodes and metal-based electrolyte layers. The layers can have a graduated porosity.

A solid oxide electrochemical device as disclosed herein comprises a solid electrolyte layer having a mid-section and a first surface on one side of the mid-section and a second surface on another side of the mid-section opposite the first surface, the first surface and second surface having surface pores formed therein; a first composite electrolyte layer composed of metal and a solid electrolyte and having a first porosity; a second composite electrolyte layer composed of metal and the solid electrolyte and having the first porosity, the solid electrolyte layer sandwiched between the first composite electrolyte layer and the second composite electrolyte layer; a cathode on one of the first composite electrolyte layer and the second composite electrolyte layer; and an anode on another of the first composite electrolyte layer and the second composite electrolyte layer. The anode comprises an anode metal layer comprising pores; anode active material; and reforming catalyst, wherein the anode active material and the reforming catalyst line walls of the pores in the anode metal layer.

A solid oxide electrochemical device as disclosed herein comprises a solid electrolyte layer; a first composite electrolyte layer composed of metal and a solid electrolyte and having a first porosity; a second composite electrolyte layer composed of metal and the solid electrolyte and having the first porosity, the solid electrolyte layer sandwiched between the first composite electrolyte layer and the second composite electrolyte layer; a cathode on one of the first composite electrolyte layer and the second composite electrolyte layer; and an anode on another of the first composite electrolyte layer and the second composite electrolyte layer. The cathode comprises a cathode metal layer comprising pores, and a cathode active material on walls of the pores of the cathode metal layer. The anode comprises an anode metal layer comprising pores, and anode active material on walls of the pores in the anode metal layer, wherein a porosity of the cathode and the anode is greater than the porosity of the first composite electrolyte layer and the second composite electrolyte layer.

A solid oxide electrochemical device as disclosed herein comprises a solid electrolyte layer; a first composite electrolyte layer composed of metal and a solid electrolyte and having a first porosity; a second composite electrolyte layer composed of metal and the solid electrolyte and having the first porosity, the solid electrolyte layer sandwiched between the first composite electrolyte layer and the second composite electrolyte layer; a cathode on one of the first composite electrolyte layer and the second composite electrolyte layer; and an anode on another of the first composite electrolyte layer and the second composite electrolyte layer. The cathode comprises a cathode metal layer comprising pores, and a cathode active material on walls of the pores of the cathode metal layer. The anode comprises an anode metal layer comprising pores, and anode active material on walls of the pores in the anode metal layer. The solid oxide electrochemical device further comprises a seal around the solid oxide electrochemical device, the seal provided by a dense perimeter of solid electrolyte in the solid electrolyte layer, a dense perimeter of metal in each of the cathode and the anode and a dense perimeter of composite metal and the solid electrolyte in each of the first composite electrolyte layer and the second composite electrolyte layer.

One or more of the following aspects may be incorporated into any of the embodiments herein if not already incorporated.

The surface pores of the solid electrolyte layer may provide between 25% to 35% porosity in the first surface and the second surface. The first surface and second surface may each have a depth of up to two microns.

The porosity of the first composite electrolyte layer and the second composite electrolyte layer can be between 30% and 60% porosity.

The porosity of the first composite electrolyte layer and the second composite electrolyte layer may be formed by a combination of sphere-shaped pores and micro-ribbons, the micro-ribbons extending essentially parallel to an in-plane direction.

The sphere-shaped pores of the first and second composite electrolyte layers may have a diameter between 5 microns and 10 microns, and the micro-ribbons may have a length of between 10 microns and 30 microns.

The porosity of the first composite electrolyte layer and the second composite electrolyte layer may be formed by a combination of sphere-shaped pores and micro-ribbons, the micro-ribbons extending essentially perpendicular to an in-plane direction.

The pores of the anode metal layer may provide a porosity of between 40% and 60%.

The pores of the anode metal layer may be a combination of sphere-shaped pores and micro-ribbons, the micro-ribbons extending essentially parallel to an in-plane direction.

The sphere-shaped pores of the anode metal layer may have a diameter of between 5 microns and 20 microns and the micro-ribbons may have a length of between 40 microns and 60 microns.

The sphere-shaped pores may connect the micro-ribbons, creating channels along a thickness direction of the anode.

A seal may be included around the anode, the solid electrolyte layer, the first composite electrolyte layer and the second composite electrolyte, the seal provided by a dense perimeter of solid electrolyte in the solid electrolyte layer, a dense perimeter of metal in the anode and a dense perimeter of composite metal/solid electrolyte in each of the first composite electrolyte layer and the second composite electrolyte layer.

The cathode may be a layer of cathode active material.

The cathode may comprise a cathode metal layer having pores, with cathode active material coating walls of the pores.

The anode metal layer and the cathode metal layer may be formed of stainless steel or may each be a different metal selected from of one of stainless steel and alloys thereof, nickel, aluminum, and copper and alloys thereof.

A cathode seal may be formed around the cathode, the cathode seal provided by a dense perimeter of metal in the cathode.

Other embodiments and aspects are described herein and contemplated in the scope of the disclosure.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Solid oxide electrochemical devices, such as solid oxide cells, use fuels such as hydrogen, methane and ethanol. Some solid oxide, or ceramic, electrochemical devices operate at average temperatures as high as 1000° C. As a result of these high operating temperatures, exotic materials can be required that can withstand such temperatures. These devices require start-up time to heat the device to operating temperature before obtaining the required performance. A slow start-up time is disadvantageous for use of the solid oxide electrochemical devices in automobiles. To utilize hydrocarbons in solid oxide cells that are endothermic in nature, high heating is required to maintain an adequate operating temperature throughout the device.

The high temperatures at which the solid oxide electrochemical devices operate deteriorate the devices due to, for example, differences in coefficients of thermal expansion between components, whether electrolyte-supported or electrode-supported. The heavy vibrations and extreme cycling experienced when used in automotive applications can also exacerbate deterioration.

Disclosed herein are robust metal supported solid oxide electrochemical devices that provide efficient gas transport channels designed into the electrode configurations. The metal supported solid oxide electrochemical devices provide sufficient mechanical strength to the device for use in automobile applications while also providing a structure that assists in bringing the device up to operating temperature and maintaining operating temperature throughout use under rigorous thermal cycles.

Figure 1:
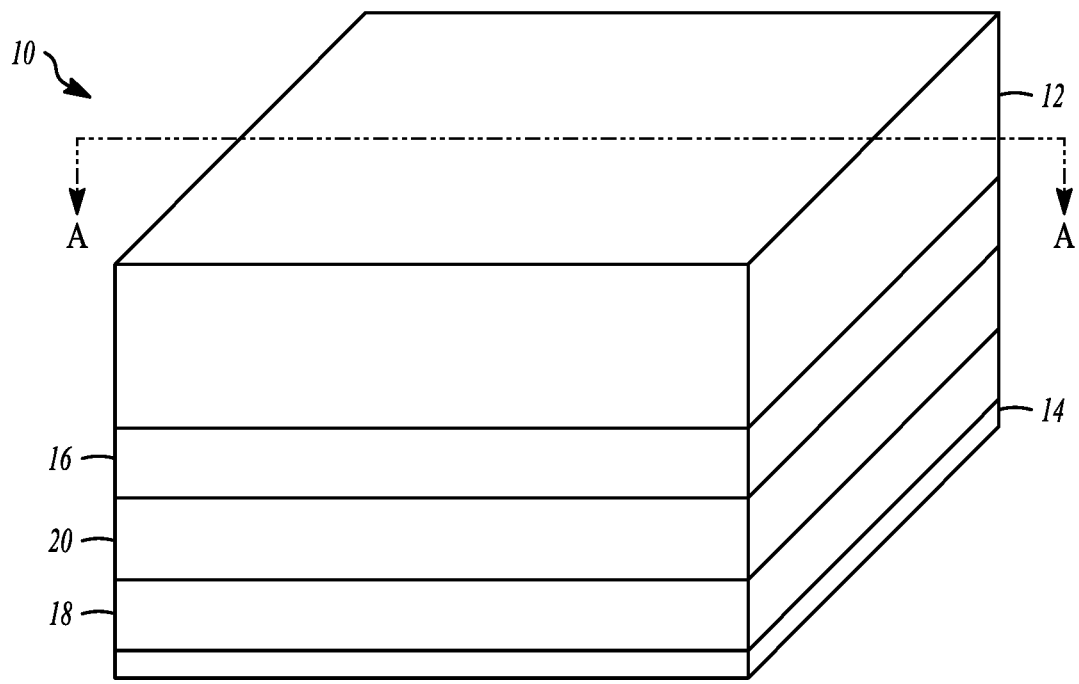
FIG. 1 is a perspective view of a unit cell of a solid oxide electrochemical device as disclosed herein.
Figure 2:
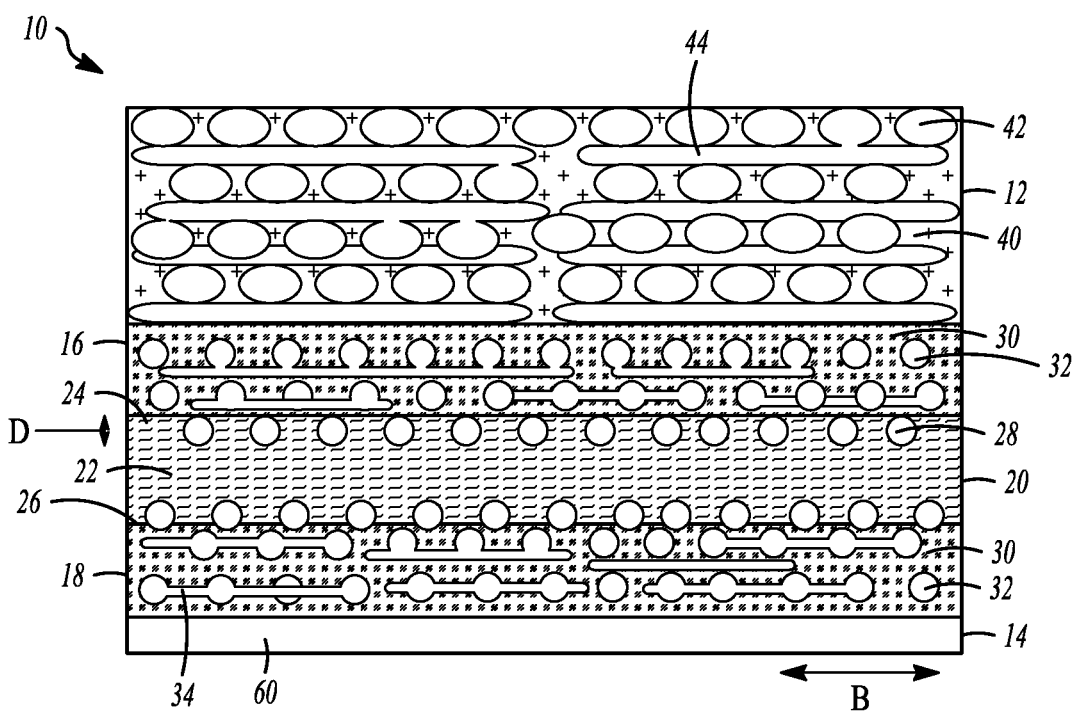
FIG. 2 is a cross-sectional view of the unit cell of the solid oxide electrochemical device of FIG. 1 along line A.

An embodiment of a unit cell 10 solid oxide electrochemical device is illustrated in FIG. 1. The solid oxide electrochemical device unit cell 10 includes an anode 12, a cathode 14, a first composite electrolyte layer 16, a second composite electrolyte layer 18, and a solid electrolyte layer 20. FIG. 2 is a cross-sectional view of an embodiment of the solid oxide electrochemical device unit cell 10 of FIG. 1 along line A.

As illustrated in FIG. 2, the solid oxide electrochemical unit cell 10 as disclosed herein comprises a solid electrolyte layer 20, the solid electrolyte layer 20 sandwiched between the first composite electrolyte layer 16 and the second composite electrolyte layer 18. The solid electrolyte layer 20 is formed of a dense solid electrolyte. The solid electrolyte is selected from the group consisting of doped bismuth oxide, scandia-ceria-stabilized zirconia (ScCeSZ), yttria-stabilized zirconia (YSZ), scandia- and yttria-stabilized zirconia (ScYSZ), scandia-, cerium- and yttria-stabilized zirconia (ScCeYSZ), and $La_{0.8}Sr_{0.2}Ga_{0.8}Mg_{0.2}O_3$ (LSGM). The solid electrolyte is greater than or equal to 99% dense. The solid electrolyte layer 20 can have a mid-section 22 and a first surface 24 on one side of the mid-section 22 and a second surface 26 on another side of the mid-section 22 opposite the first surface. The first surface 24 and second surface 26 can have surface pores 28 formed therein. The surface pores 28 of the solid electrolyte layer 20 provide between 25% to 35% porosity in the first surface 24 and the second surface 26, the first surface 24 and second surface 26 each having a depth D of up to two microns. These surface pores 28 are created in the surface of the dense solid electrolyte to increase the gas diffusion through the unit cell 10, while maintaining a dense solid electrolyte mid-section 22. The thickness of the solid electrolyte layer 20 in total is between 5 microns and 10 microns.

The first composite electrolyte layer 16 is composed of a metal and a solid electrolyte composite 30 and has a porosity. The second composite electrolyte layer 18 is composed of the metal and the solid electrolyte composite 30 and has a porosity similar to the porosity of the first composite electrolyte layer 16. The solid electrolyte used in the composite 30 is selected from the group consisting of doped bismuth oxide, scandia-ceria-stabilized zirconia (ScCeSZ), yttria-stabilized zirconia (YSZ), scandia- and yttria-stabilized zirconia (ScYSZ), scandia-, cerium- and yttria-stabilized zirconia (ScCeYSZ), and $La_{0.8}Sr_{0.2}Ga_{0.8}Mg_{0.2}O_3$ (LSGM). The solid electrolyte of the first composite electrolyte layer 16 and the second composite electrolyte layer 18 can be the same solid electrolyte used in the solid electrolyte layer 20 or can have a higher conductivity than the solid electrolyte forming the solid electrolyte layer 20. For example, the solid electrolyte used in the solid electrolyte layer 20 can be ScCeYSZ and the solid electrolyte used on the composite 30 can be Er-doped bismuth oxide. The metal used in the composite 30 can be stainless steel 430. Other examples of metal that can be used in the composite 30 include nickel, aluminum, stainless steel alloys such as Crofer®, and copper alloys.

Figure 3:
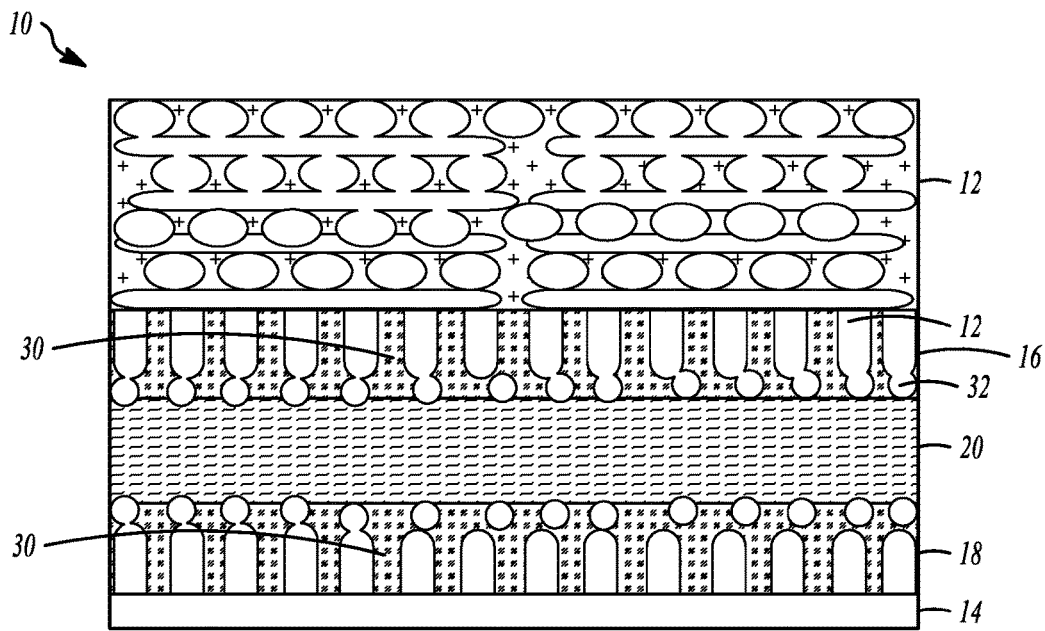
FIG. 3 is a cross-sectional view of another aspect of the unit cell of the solid oxide electrochemical device of FIG. 2.

The porosity of the first composite electrolyte layer 16 and the second composite electrolyte layer 18 is greater than the porosity of the first surface 24 and the second surface 26 of the solid electrolyte layer 20 and is between 30% and 60% porosity. All ranges provided herein are inclusive of the end points. The porosity of the first composite electrolyte layer 16 and the second composite electrolyte layer 18 is formed by a combination of sphere-shaped pores 32 and microribbons 34. The sphere-shaped pores 32 can have a diameter between 5 microns and 10 microns and the micro-ribbons can have a length of between 10 microns and 30 microns. The sphere-shaped pores 32 are positioned to connect micro-ribbons 34 to provide channels through the first composite electrolyte layer 16 and the second composite electrolyte layer 18 for gas diffusion. The micro-ribbons 34 can extend essentially parallel to an in-plane direction illustrated by arrow B. Alternatively, the micro-ribbons 34 can extend essentially perpendicular to the in-plane direction, as illustrated in FIG. 3, creating direct gas channels through the first composite electrolyte layer 16 and the second composite electrolyte layer 18.

The metal and solid electrolyte composite 30 of the first composite electrolyte layer 16 and the second composite electrolyte layer 18 increases the mechanical strength of the unit cell 10 in combination with the other layers, as well as assists in heating the unit cell in start-up, and maintaining the cell temperature during operation. A thickness of each of the first composite electrolyte layer 16 and the second composite electrolyte layer 18 is about 30 microns as a non-limiting example.

The anode 12 is layered on one of the first composite electrolyte layer 16 and the second composite electrolyte layer 18, shown in the figures on the first composite electrolyte layer 16. The anode 12 comprises an anode metal layer 40 comprising pores. The anode metal layer 40 is formed of one of stainless steel and alloys thereof, such as Crofer®, nickel, aluminum, and copper and alloys thereof. The porosity of the anode metal layer 40 is greater than the porosity of the first composite electrolyte layer 16 and the second composite electrolyte layer 18, with the porosity being between 40% and 60%. The porosity of the various layers provides a gradient, with the porosity increasing from the solid electrolyte layer toward the anode 12. The pores of the anode metal layer 40 are a combination of sphere-shaped pores 42 and micro-ribbons 44, with the micro-ribbons 44 extending essentially parallel to the in-plane direction. The sphere-shaped pores 42 have a diameter of between 5 microns and 20 microns and the micro-ribbons 44 have a length of between 40 microns and 60 microns. The sphere-shaped pores 42 connect the micro-ribbons 44, creating channels along a thickness direction of the anode 12 for gas diffusion. The micro-ribbons 44 have a shape and size that assists in removing by-products from the anode 12.

Figure 4:
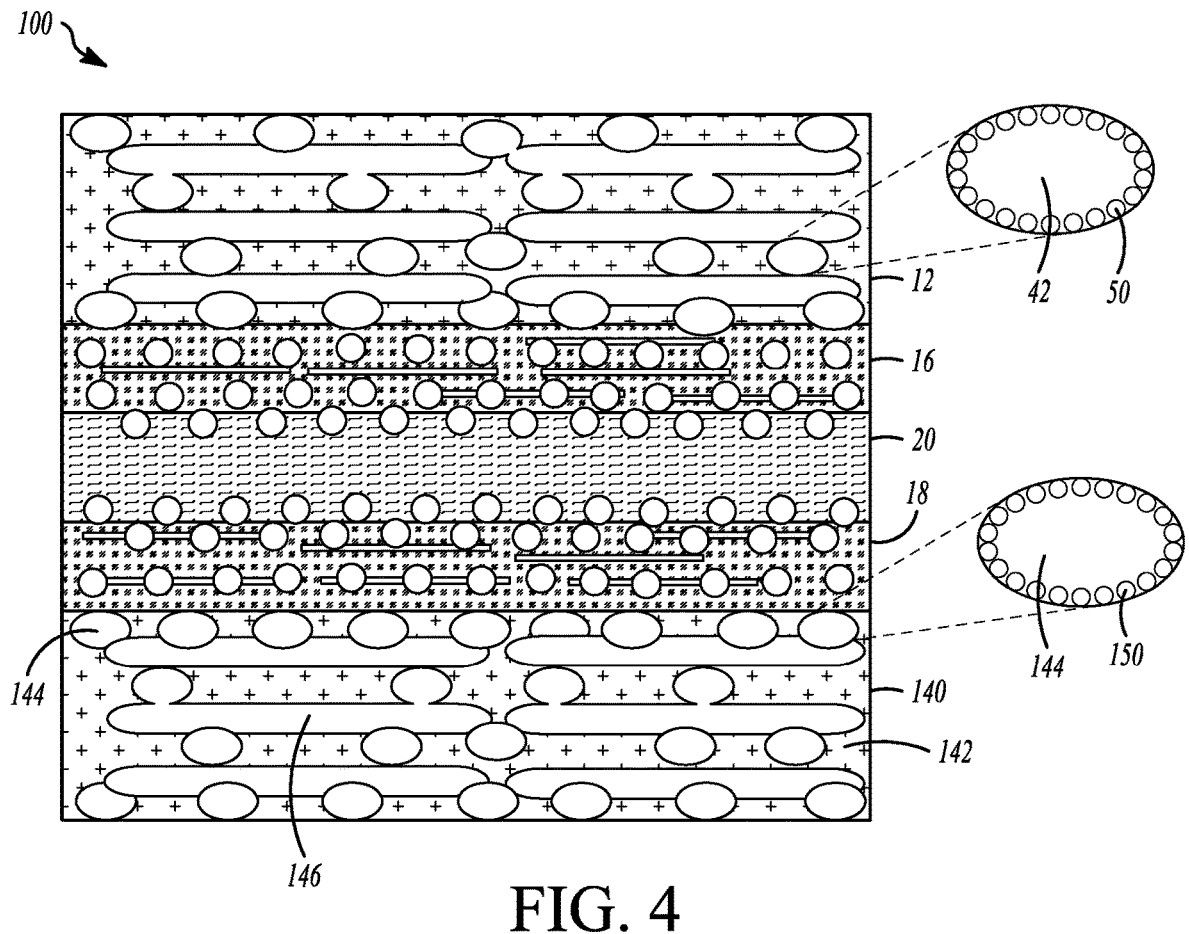
FIG. 4 is a cross-sectional view of another aspect of the unit cell of the solid oxide electrochemical device of FIG. 2.

The pores of the anode metal layer 40 are lined with anode active material 50, as illustrated in FIG. 4. The anode active material 50 can be, for example, one or more of nickel-based catalyst containing mixtures of cobalt and/or dopants of precious metals such as palladium, rhodium, and/or platinum, nickel-cerium oxide (Ni-CeOx), and cerium-zirconium mixed oxides ($CeZrO_{2-y}$) with transition metals or noble metals. Other non-limiting examples include Ni—YSZ (Y-stabilized zirconia), Ni-GDC (Gd-doped ceria), Ni-SDC (Sm-doped ceria), Ni—ScYSZ (Sc, Y stabilized zirconia), and perovskite anodes (e.g., $SrCo_{0.2}Fe_{0.4}Mo_{0.4}O_3$).

The pores of the anode metal layer 40 can also be lined with reforming catalyst 52. The reformer catalyst type depends on the type of fuel being reformed. As non-limiting examples, the reformer catalyst 52 can be Ni—$BaCe_{0.7}Zr_{0.1}Y_{0.2}O_{3-\delta}$ when the fuel is methane and can be Ru—Ni—Co/CZ or CeZrOx with multivalent ions such as Fe, Ni, Co and noble metals such as Pt, Ru, Rh, Pd, Ir, when the fuel is ethanol. The anode active material 50 and the reformer catalyst 52 can be mixed and deposited in pores of the anode metal layer 40 in one or more layers, as a non-limiting example. The metal support structure of the anode 12 provides mechanical strength to the unit cell 10 as well as assisting in advancing temperature increase during start-up and maintaining unit cell temperature during operation.

Figure 6:
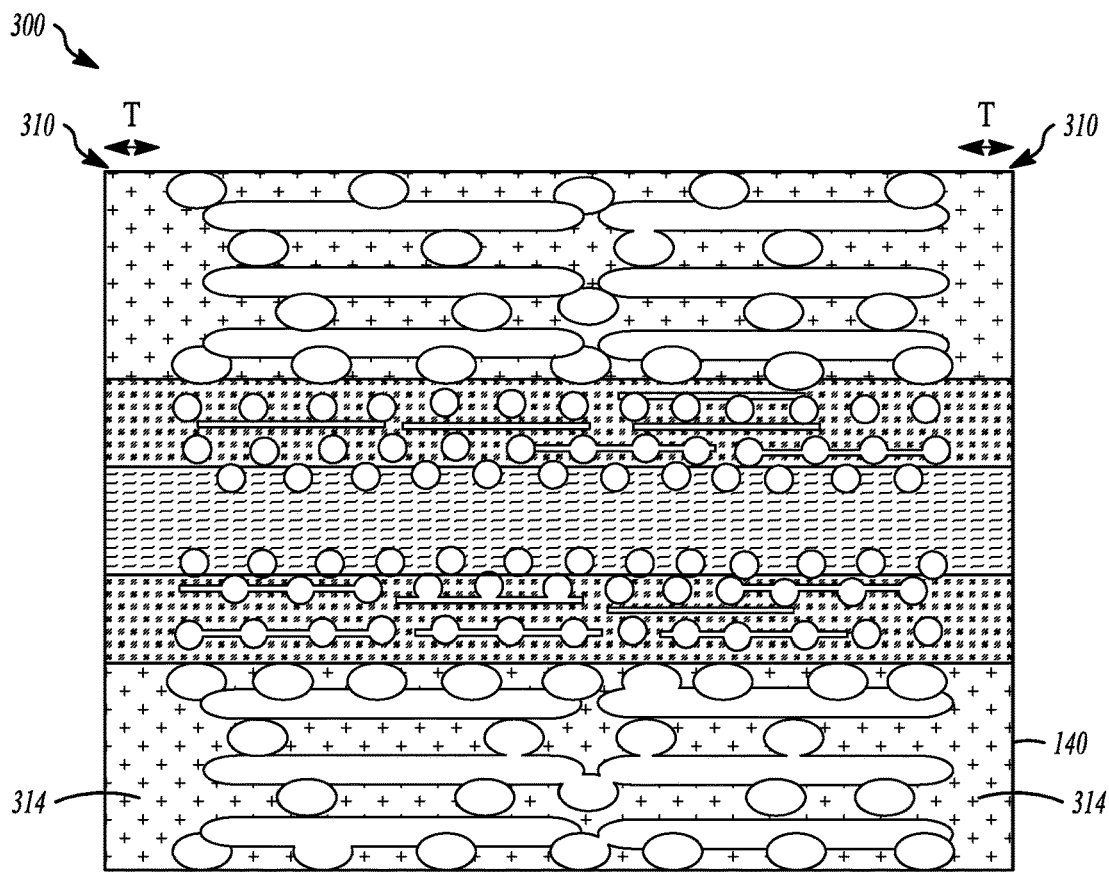
FIG. 6 is a cross-sectional view of another aspect of the unit cell of the solid oxide electrochemical device of FIG. 4.

The cathode 14 is layered on the other of the first composite electrolyte layer 16 and the second composite electrolyte layer 18 opposite the anode 12, shown in the figures on the second composite electrolyte layer 18. The cathode 14 as shown in FIGS. 2, 3 and 6 is composed of cathode active material 60. The cathode active material 60 can be, for example, cerium-zirconium mixed oxides ($CeZrO_{2-y}$) with transition metals or noble metals, lanthanum strontium manganite (LSM)-based perovskites, Sr-doped lanthanum ferrite (LSF) materials, Sr-doped lanthanum ferro-cobaltite (LSCF) materials, lanthanum strontium cobaltite (LSC), praseodymium oxide (PrOx), and neodymium oxide (NdOx). Other non-limiting examples include $(La_{0.8}Sr_{0.2})_{0.95}MnO_3$, $La_{0.6}Sr_{0.4}CoO_3$, $Sr_{0.5}Sm_{0.5}O_3$, $Ba_{0.5}Sr_{0.5}Co_{0.8}Fe_{0.2}O_3$, $(La_{0.6}Sr_{0.4})_{0.95}(Co_{0.2}Fe_{0.8})O_3$, $PrBa_{0.5}Sr_{0.5}Co_{1.5}Fe_{0.5}O_{5+y}$ with and without Gd-doped ceria.

Using a cathode 14 that is a layer of cathode active material 60 keeps the thickness of the unit cell 10 down. An alternative cathode 140 is illustrated in the unit cell 100 of FIG. 4. As other layers are those as previously described, the description will not be repeated. To further improve the mechanical strength and assist in quickly increasing start-up temperature, the cathode 140 can comprise a cathode metal layer 142 comprising pores. The cathode metal layer 142 is formed of one of stainless steel and alloys thereof, such as Crofer®, nickel, aluminum, and copper and alloys thereof. The anode metal layer 40 and the cathode metal layer 140 can both be stainless steel. The anode metal layer 40 and the cathode metal layer 140 can be different metals, with the metals selected from stainless steel and alloys thereof, such as Crofer®, nickel, aluminum, and copper and alloys thereof.

The porosity of the cathode metal layer 140 is greater than the porosity of the first composite electrolyte layer 16 and the second composite electrolyte layer 18, with the porosity being between 40% and 60%. The porosity of the various layers provides a gradient, with the porosity increasing from the solid electrolyte layer toward the cathode 140. The pores of the cathode metal layer 140 are a combination of sphere-shaped pores 144 and micro-ribbons 146, with the micro-ribbons 146 extending essentially parallel to the in-plane direction B. The sphere-shaped pores 144 have a diameter of between 5 microns and 20 microns and the micro-ribbons 146 have a length of between 40 microns and 60 microns. The sphere-shaped pores 144 connect the micro-ribbons 146, creating channels along a thickness direction of the cathode 140 for gas diffusion. The micro-ribbons 146 have a shape and size that assists in removing by-products from the cathode 140.

The pores of the cathode metal layer 140 are lined with cathode active material 150, as illustrated in FIG. 4. The cathode active material 150 can be, for example, one or more of The cathode active material 60 can be, for example, cerium-zirconium mixed oxides ($CeZrO_{2-y}$) with transition metals or noble metals, lanthanum strontium manganite (LSM)-based perovskites, Sr-doped lanthanum ferrite (LSF) materials, Sr-doped lanthanum ferro-cobaltite (LSCF) materials, lanthanum strontium cobaltite (LSC), praseodymium oxide (PrOx), and neodymium oxide (NdOx). Other non-limiting examples include $(La_{0.8}Sr_{0.2})_{0.95}MnO_3$, $La_{0.6}Sr_{0.4}CoO_3$, $Sr_{0.5}Sm_{0.5}O_3$, $Ba_{0.5}Sr_{0.5}Co_{0.8}Fe_{0.2}O_3$, $(La_{0.6}Sr_{0.4})_{0.95}(Co_{0.2}Fe_{0.8})O_3$, $PrBa_{0.5}Sr_{0.5}Co_{1.5}Fe_{0.5}O_{5+y}$, with and without Gd-doped ceria.

Figure 5:
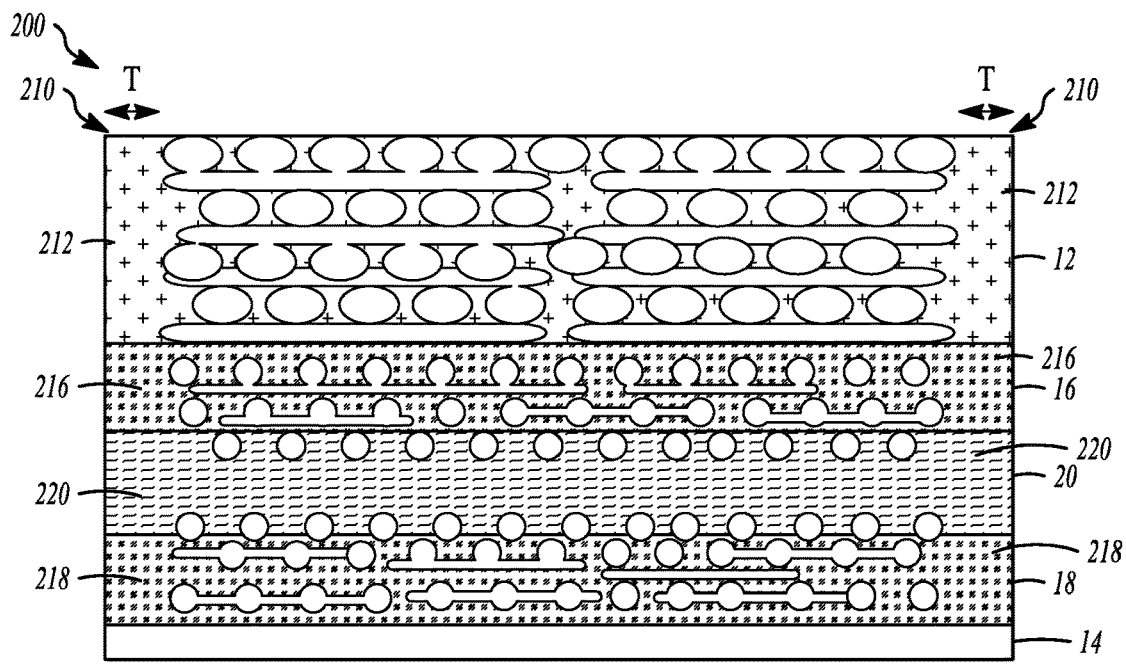
FIG. 5 is a cross-sectional view of another aspect of the unit cell of the solid oxide electrochemical device of FIG. 2.

In the embodiments of the solid oxide fuel cell disclosed herein, a seal can be included around the perimeter of the unit cells. The seal provides for easy scale-up of cells as it eliminates the need for a separate mechanical seal or shim around each cell. The seal is necessary to prevent short circuiting or cross contamination. As illustrated in FIG. 5, when the cathode 14 is a layer of active cathode material, the unit cell 200 can have a seal 210 around the anode 12, the solid electrolyte layer 20, the first composite electrolyte layer 16 and the second composite electrolyte layer 18. The seal 210 is formed of a dense perimeter 220 of solid electrolyte in the solid electrolyte layer 20, a dense perimeter 212 of metal in the anode 12, and a dense perimeter 216, 218 of composite metal/solid electrolyte in each of the first composite electrolyte layer 16 and the second composite electrolyte layer 18. The dense perimeters are formed during manufacture of the layers by not creating pores in the borders of each layer. The border with no pores is between 3 microns and 5 microns in thickness T. The solid electrolyte layer 20 is not created with pores. The solid electrolyte layer 20 can have surface pores 28 formed in the first and second surfaces 24 and 26, and if so, these surface pores are not created along the borders of the solid electrolyte layer 20.

As illustrated in FIG. 6, when the cathode 140 has a cathode metal layer 142, the unit cell 300 can have the seal 310 around the anode 12, the solid electrolyte layer 20, the first composite electrolyte layer 16 and the second composite electrolyte layer 18, but the seal 310 is further included around the cathode 140. The seal 310 is formed of the dense perimeter 220 of solid electrolyte in the solid electrolyte layer 20, the dense perimeter 212 of metal in the anode 12, the dense perimeter 216, 218 of composite metal/solid electrolyte in each of the first composite electrolyte layer 16 and the second composite electrolyte layer 18, as well as a dense perimeter 314 of metal in the cathode 140. The dense perimeters are formed during manufacture of the layers by not creating pores in the borders of each layer. The border with no pores is between 3 microns and 5 microns in thickness T. The solid electrolyte layer 20 is not created with pores. The solid electrolyte layer 20 can have surface pores 28 formed in the first and second surfaces 24 and 26, and if so, these surface pores are not created along the borders of the solid electrolyte layer 20.

The unit cells disclosed herein can be made by methods known to those skilled in the art. As a non-limiting example, the pores in the cathode, anode and composite electrolyte layers can be made with poreformer. As non-limiting examples, the sphere-shaped pores can be formed with PMMA and the microribbons can be formed using nylon threads, both of which are then heated to remove. The layers can be tape cast with the solid electrolyte and laminated by hot pressing. The layers can undergo binder burnout in air and sintering in a reducing gas. The surface pores in the solid electrolyte can be formed using laser patterning as a non-limiting example. The anode metal layer can be infiltrated with the anode active material and/or reformer catalyst and the cathode metal layer can be infiltrated with the cathode active material. Current collectors and interconnects for gas feed and distribution can be added.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A solid oxide electrochemical device, comprising:
    a solid electrolyte layer having a mid-section and a first surface on one side of the mid-section and a second surface on another side of the mid-section opposite the first surface, the first surface and second surface having surface pores formed therein, wherein the surface pores of the solid electrolyte layer provide between 25% to 35% porosity in the first surface and the second surface, the first surface and the second surface each having a depth of up to two microns;
    a first composite electrolyte layer composed of metal and a solid electrolyte and having a porosity;
    a second composite electrolyte layer composed of metal and the solid electrolyte and having the porosity, the solid electrolyte layer sandwiched between the first composite electrolyte layer and the second composite electrolyte layer;
    a cathode on one of the first composite electrolyte layer and the second composite electrolyte layer; and
    an anode on another of the first composite electrolyte layer and the second composite electrolyte layer, the anode comprising:
        an anode metal layer comprising pores;
        anode active material; and
        reforming catalyst, wherein the anode active material and the reforming catalyst line walls of the pores in the anode metal layer.

2. The solid oxide electrochemical device of claim 1, wherein the porosity of the first composite electrolyte layer and the second composite electrolyte layer is between 30% and 60% porosity.

3. The solid oxide electrochemical device of claim 1, wherein the porosity of the first composite electrolyte layer and the second composite electrolyte layer is formed by a combination of sphere-shaped pores and micro-ribbons, the micro-ribbons extending essentially parallel to an in-plane direction.

4. The solid oxide electrochemical device of claim 3, wherein the sphere-shaped pores have a diameter between 5 microns and 10 microns, and the micro-ribbons have a length of between 10 microns and 30 microns.

5. The solid oxide electrochemical device of claim 1, wherein the porosity of the first composite electrolyte layer and the second composite electrolyte layer is formed by a combination of sphere-shaped pores and micro-ribbons, the micro-ribbons extending essentially perpendicular to an in-plane direction.

6. The solid oxide electrochemical device of claim 1, wherein the solid electrolyte of the first composite electrolyte layer and the second composite electrolyte layer has a higher conductivity than a solid electrolyte forming the solid electrolyte layer.

7. The solid oxide electrochemical device of claim 1, wherein the pores of the anode metal layer provide a porosity of between 40% and 60%.

8. The solid oxide electrochemical device of claim 1, wherein the pores of the anode metal layer are a combination of sphere-shaped pores and micro-ribbons, the micro-ribbons extending essentially parallel to an in-plane direction.

9. The solid oxide electrochemical device of claim 8, wherein the sphere-shaped pores have a diameter of between 5 microns and 20 microns and the micro-ribbons have a length of between 40 microns and 60 microns.

10. The solid oxide electrochemical device of claim 8, wherein the sphere-shaped pores connect the micro-ribbons, creating channels along a thickness direction of the anode.

11. The solid oxide electrochemical device of claim 1, wherein the anode metal layer is formed of one of stainless steel and alloys thereof, nickel, aluminum, and copper and alloys thereof.

12. The solid oxide electrochemical device of claim 1, further comprising:
a seal around the anode, the solid electrolyte layer, the first composite electrolyte layer and the second composite electrolyte layer, the seal provided by a dense perimeter of solid electrolyte in the solid electrolyte layer, a dense perimeter of metal in the anode and a dense perimeter of composite metal/solid electrolyte in each of the first composite electrolyte layer and the second composite electrolyte layer.

13. The solid oxide electrochemical device of claim 1, wherein the cathode is a layer of cathode active material.

14. The solid oxide electrochemical device of claim 1, wherein the cathode comprises a cathode metal layer having pores, with cathode active material coating walls of the pores.

15. The solid oxide electrochemical device of claim 14, wherein the anode metal layer and the cathode metal layer are formed of stainless steel or are each a different metal selected from of one of stainless steel and alloys thereof, nickel, aluminum, and copper and alloys thereof.

16. The solid oxide electrochemical device of claim 14, wherein the pores of the cathode metal layer are a combination of sphere-shaped pores and micro-ribbons, the micro-ribbons extending essentially parallel to an in-plane direction.

17. The solid oxide electrochemical device of claim 14, further comprising a cathode seal around the cathode, the cathode seal provided by a dense perimeter of metal in the cathode.

18. A solid oxide electrochemical device, comprising:
a solid electrolyte layer;
a first composite electrolyte layer composed of metal and a solid electrolyte and having a first porosity;
a second composite electrolyte layer composed of metal and the solid electrolyte and having the first porosity, the solid electrolyte layer sandwiched between the first composite electrolyte layer and the second composite electrolyte layer, wherein the metal in the first composite electrolyte layer and the second composite electrolyte layer is stainless steel, stainless steel alloys, nickel, aluminum, or copper alloys;
a cathode on one of the first composite electrolyte layer and the second composite electrolyte layer, the cathode comprising:
a cathode metal layer comprising pores; and
a cathode active material on walls of the pores of the cathode metal layer; and
an anode on another of the first composite electrolyte layer and the second composite electrolyte layer, the anode comprising:
an anode metal layer comprising pores; and
anode active material on walls of the pores in the anode metal layer,
wherein a second porosity of the cathode and the anode is greater than the first porosity of the first composite electrolyte layer and the second composite electrolyte layer.

19. The solid oxide electrochemical device of claim 18, wherein the solid electrolyte layer has a mid-section and a first surface on one side of the mid-section and a second surface on another side of the mid-section opposite the first surface, the first surface and second surface having surface pores formed therein, the surface pores providing a surface porosity that is less than the first porosity of the first composite electrolyte layer and the second composite electrolyte layer.

20. The solid oxide electrochemical device of claim 18, further comprising:
a seal around the solid oxide electrochemical device, the seal provided by a dense perimeter of solid electrolyte in the solid electrolyte layer, a dense perimeter of metal in each of the anode and the cathode, and a dense perimeter of composite metal/solid electrolyte in each of the first composite electrolyte layer and the second composite electrolyte layer.

21. The solid oxide electrochemical device of claim 18, wherein the solid electrolyte layer has surface pores that provide between 25% to 35% porosity in a first surface and a second surface of the solid electrolyte layer, the first surface and the second surface each having a depth of up to two microns.

* * * * *